(12) United States Patent
Broido et al.

(10) Patent No.: US 9,411,526 B1
(45) Date of Patent: Aug. 9, 2016

(54) FILESYSTEM MANAGEMENT

(71) Applicant: Infinidat LTD., Herzliya (IL)

(72) Inventors: Jacob Broido, Tel-Aviv (IL); Eran Brown, Givatayim (IL)

(73) Assignee: INFINIDAT LTD., Herzliya (IL)

( * ) Notice: Subject to any disclaimer, the term of this patent is extended or adjusted under 35 U.S.C. 154(b) by 88 days.

(21) Appl. No.: 14/616,756

(22) Filed: Feb. 9, 2015

(51) Int. Cl.
*G06F 12/00* (2006.01)
*G06F 3/06* (2006.01)
*G06F 17/30* (2006.01)

(52) U.S. Cl.
CPC .............. *G06F 3/0619* (2013.01); *G06F 3/065* (2013.01); *G06F 3/067* (2013.01); *G06F 3/0643* (2013.01); *G06F 17/30* (2013.01); *G06F 17/30091* (2013.01)

(58) Field of Classification Search
CPC ..... G06F 3/0619; G06F 3/0643; G06F 3/065; G06F 3/067; G06F 17/30; G06F 17/30091
See application file for complete search history.

(56) References Cited

U.S. PATENT DOCUMENTS

2003/0191745 A1* 10/2003 Jiang ................. G06F 17/30067

* cited by examiner

*Primary Examiner* — Shawn X Gu
(74) *Attorney, Agent, or Firm* — Reches Patents

(57) ABSTRACT

A method for managing a filesystem by a storage system, the method may include maintaining, by a storage system, a filesystem data structure that comprises filesystem pathnames metadata related to a filesystem that is stored in the storage system; receiving, from a client that is coupled to the storage system via a network, a request to obtain a client filesystem object list related to at least a certain portion of the filesystem; generating, in response to the request and in response to the filesystem data structure, the client filesystem object list, wherein the client filesystem object list comprises at least one pathname of at least one filesystem object that belongs to the at least certain portion of the filesystem; and sending the client filesystem object list to the client.

16 Claims, 4 Drawing Sheets

FILESYSTEM MANAGEMENT

BACKGROUND

Filesystem and operating systems that interface with filesystems generally provide commands for searching and locating files within a tree of a filesystem according to specified criteria.

An example for such command is the UNIX 'find' command-line that searches through specified directory or directory tree(s) of a filesystem, according to specified search criteria. Examples of search criteria include file name patterns, e.g. 'xyz*'' for searching files starting with xyz, a compound file name pattern, time constrains related to the modification time or access time of the file, size limits, ownership limitation, certain strings within the file content ('grep' command-line utility), directories or sub-trees to be searched in, and other criteria.

The 'find' command is considered as a slow command, since it involves massive disk access for reading the relevant parts of the filesystem catalogue (directories and files' metadata). When NAS (Network-Attached Storage) is used to access a network filesystem, the latency imposed by the network makes it unreasonably to use the 'find' command.

Yet other solutions are based upon a cyclic update of an index Data-Base by performing periodical queries of the file systems by the Client are inefficient because they are time consuming and thus are executed every few days and thus their content is erroneous most of the time.

SUMMARY

According to an embodiment of the invention there may be provided a method, the method may include: maintaining, by a storage system, a filesystem data structure that may include filesystem pathnames metadata related to a filesystem that is stored in the storage system; receiving, from a client that is coupled to the storage system via a network, a request to obtain a client filesystem object list related to at least a certain portion of the filesystem; generating, in response to the request and in response to the filesystem data structure, the client filesystem object list, wherein the client filesystem object list may include at least one pathname of at least one filesystem object that belongs to the at least certain portion of the filesystem; and sending the client filesystem object list to the client.

The filesystem pathnames metadata may include pathnames of filesystem objects that belong to the filesystem.

The filesystem pathnames metadata may include pathname retrieval information that facilitates a retrieval of pathnames of filesystem objects that belong to the filesystem.

The filesystem data structure further may include filesystem attribute metadata that differs from the filesystem pathnames metadata.

The filesystem attribute metadata may include attributes of filesystem objects that belong to the filesystem.

The attribute of a filesystem object of the filesystem objects that belongs to the filesystem may be a size of the filesystem object.

The method an attribute of a filesystem object of the filesystem objects that belongs to the filesystem may be a timestamp related to an operation applied on the filesystem object.

The filesystem attribute metadata may include attributes retrieval information that facilitates a retrieval of attributes of filesystem objects that belong to the filesystem.

The generating of the client filesystem object list is responsive to client access permissions related to filesystem objects that belong to the at least certain portion of the filesystem.

The request to obtain the client filesystem object list may include a predefined term that represents the client filesystem object list.

The method may include storing, in a certain location in the filesystem, an executable file that once executed by the client causes the client to respond to the request to obtain the client filesystem object list related to the at least certain portion of the filesystem by generating the client filesystem object list.

The maintaining may include updating in real time the filesystem data structure in response to any change in the filesystem that mandates a change in the content of the filesystem data structure.

The maintaining may include updating in real time the filesystem data structure in response to an addition of any filesystem object to the filesystem, a deletion of any filesystem object of the filesystem, a renaming of any filesystem object of the filesystem and a moving of any file system object of the filesystem.

The request may be a network-attached storage (NAS) storage read request.

According to an embodiment of the invention there may be provided a non-transitory computer readable medium may store instructions that once executed by a storage system cause the storage system to maintain a filesystem data structure that comprises filesystem pathnames metadata related to a filesystem that is stored in the storage system; receive, from a client that is coupled to the storage system via a network, a request to obtain a client filesystem object list related to at least a certain portion of the filesystem; generate, in response to the request and in response to the filesystem data structure, the client filesystem object list, wherein the client filesystem object list comprises at least one pathname of at least one filesystem object that belongs to the at least certain portion of the filesystem; and send the client filesystem object list to the client.

According to an embodiment of the invention there may be provided a storage system that may include a controller and an interface, wherein the controller is configured to maintain a filesystem data structure that comprises filesystem pathnames metadata related to a filesystem that is stored in the storage system; wherein the interface is configured to receive, from a client that is coupled to the storage system via a network, a request to obtain a client filesystem object list related to at least a certain portion of the filesystem; wherein the controller is configured to generate, in response to the request and in response to the filesystem data structure, the client filesystem object list, wherein the client filesystem object list comprises at least one pathname of at least one filesystem object that belongs to the at least certain portion of the filesystem; and wherein the interface is configured to send the client filesystem object list to the client.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
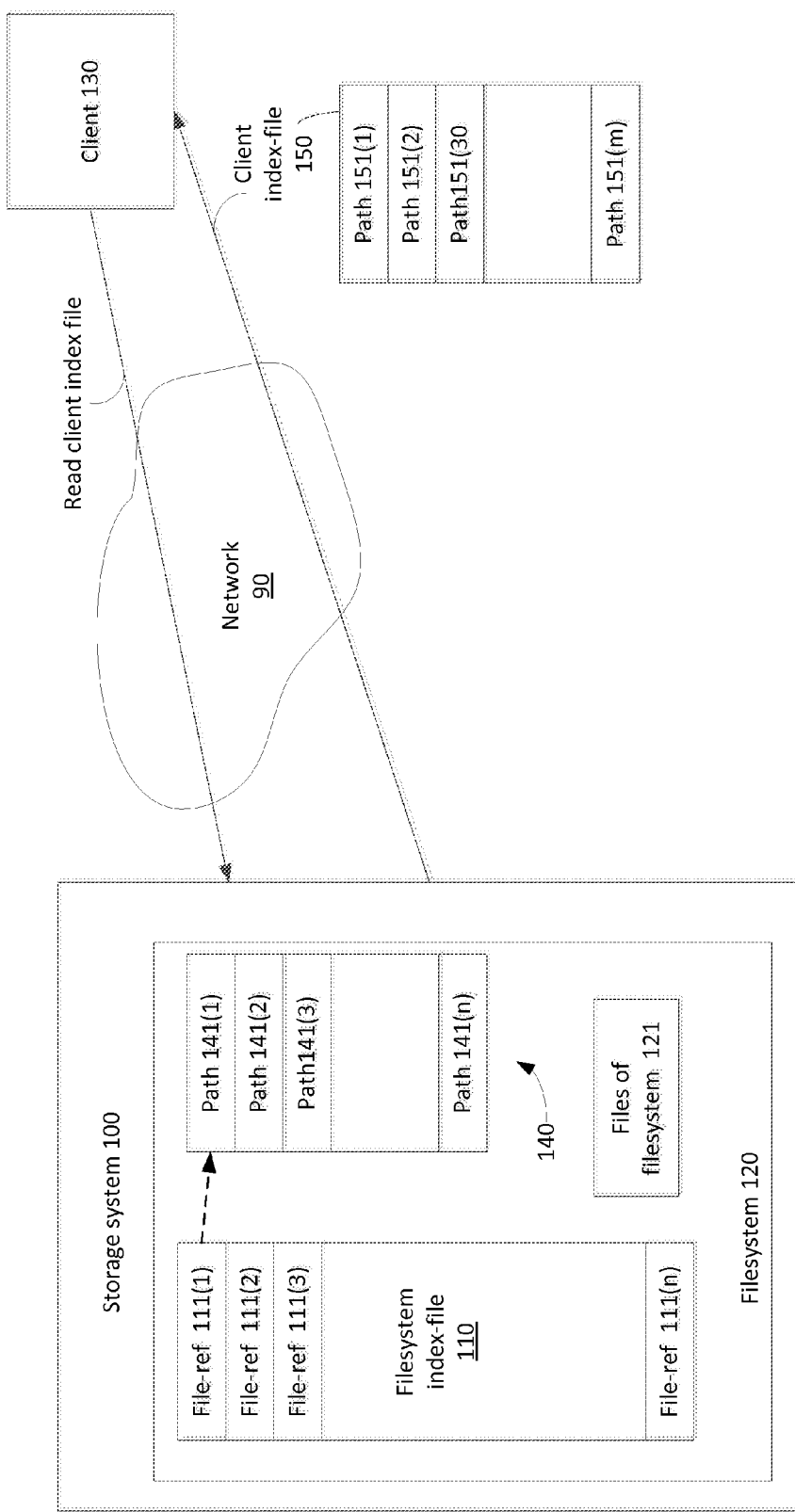
FIG. 1 illustrates a storage system, a network and a client according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any reference to the terms "comprising", "comprise", "comprises" and "including" should also be applied mutatis mutandis to a reference to the terms "consisting" and/or "consisting essentially of". Thus, for example, any reference to a method that includes various steps may refer to a method that may include additional steps but may also refer to a method that is limited only (or essentially limited to only) these various steps.

A file system object (may also be referred herein as an object) may be a file, a directory, a hard link, or any other object that may exist in a file system. For simplicity of explanation it is assumed that the file system object is a file.

According to an embodiment of the invention there is provided a storage system that is configured to manage filesystem metadata such as a filesystem list file (also referred to as filesystem index file) in a predefined directory of each filesystem. The filesystem list file includes a list of all the files of the filesystem and at least filesystem pathnames metadata that includes information required to obtain the pathnames (filename and full directory path per each file) of the files within the filesystem tree.

The storage system may also store other types of filesystem metadata—such as filesystem attribute metadata that may include attributes of the filesystem objects that belong to the filesystem (e.g., inodes and directories information).

Based on the filesystem list file, the storage system can provide a client filesystem object list that includes pathnames of all or part of the files in the filesystem and optionally, additional attributes of each file.

Whenever a change in the list file of the filesystem occurs, the filesystem list file is updated, for example: (i) A new entry for a new file is added to the filesystem list file upon creation of a new file; (ii) An entry is deleted from the list file upon file deletion, and (iii) an entry is changed upon file rename or move (from directory to another directory) so as to reflect the new name or new path of the file.

The filesystem list file may include a reference for each file in the filesystem. The reference may include a full pathname, an inode number or any other pointer to the file's metadata, both inode and full pathname, etc.

The filesystem list file facilitates building a client filesystem object list, which is provided to the client upon request. The client filesystem object list includes at least pathnames for files in the filesystem. The client filesystem object list has a predefined (well-known) name that is published to the client, for example, the client filesystem object list may be named 'indexFile'. The file named 'indexFile' is a virtual file that does not really exist, as it is built upon request.

When a client that is connected to the storage system needs to perform a 'find' command or a 'locate' command, the client first needs to read the client filesystem object list, using a read-request for the client list-file, wherein the read request is a command provided by the operating-system (OS) of the client, e.g., by using the Linux command: 'cat/myfilesystem/indexFile', wherein 'myfilesystem' is a name of a mount point previously established for gaining access to the requested filesystem within the storage system.

Alternatively, the client can use the command: 'cat indexFile' (without the prefix 'myfilesystem/') if the requested filesystem ('myfilesystem') was previously set as a default path for access (e.g., by using the change directory (cd) command). The above example refers to cases where the client needs to receive a list of all the files in the filesystem and therefore the read-request specifies the path of the root of the filesystem (e.g., '/', or myfilesystem/'). In cases where the client requests to receive a subset of the filesystem's files, e.g., a list of the files under a certain sub-tree, the client can specify the path to the subtree, preceding the name of the index file. For example, the client can request only the files under the directory dirB that is under a directory dirA that is under the root, by using the command: 'cat /dirA/dirB/indexFile'.

The Linux command is then translated into a NAS read command, e.g., NFS-READ (which may be preceded by NFS-LOOKUP command(s)).

Upon receiving a read request (e.g., NFS-READ) to read the client filesystem object list, the storage system creates the client filesystem object list based on the filesystem list file of the requested filesystem. The building may include selecting among the entire filesystem's files only requested files and/or only allowed files and obtaining required file's attributes. The obtained file's attributes includes at least the pathnames, but may include additional attributes, such as size and timestamps.

If the filesystem list file includes inode numbers (or other pointers to file's metadata) as file references, the full pathnames of the files are obtained based on the inode numbers. Other file attributes may also be obtained from the inode table and written to the client filesystem object list along with the file's pathname, for example: size, modified time, etc.

Optionally, ACLs (Access Control Lists) or any other permission object associated with the files can be checked for access permission granted to the client that sent the read-request and only files that are permitted to be read by the client will be included in the client filesystem object list. If a certain sub-tree is not permitted to be accessed by the client, then none of the files or directories within the certain sub-tree will be included in the client filesystem object list. Similarly, if certain files are not permitted to be accessed by the client, then none of the certain files will be included in the client filesystem object list.

In case where the client specifies a path preceding the name of the client filesystem object list (e.g., VdirA/indexFile'), only files under the specified path will be selected. In this case, the prefix of the path to each file in the filesystem (or in the group of permitted files) is compared to the specified path and only if the specified path is identified in the prefix of the file's pathname, the file will be included in the response. For example: if the requested client filesystem object list was indicated as '/dirA/indexFile', a file under the path '/' or under '/dirB/' will be omitted, while files under e.g., /dirA/' or under /dirA/dirB/' will be included.

According to an embodiment of the invention, the content of the filesystem list file can be sent without changes or filtering, in cases where all the following conditions are fulfilled: (i) authentication/permission check is not required, (ii) the client provided the root as the path, (iii) the filesystem list file includes all the information required for the client, for example, the filesystem list file may include full pathnames while full pathnames are the only required information.

The client, upon receiving the client filesystem object list, can perform the UNIX find/locate command or any similar simple text search on the received client filesystem object list.

In case the NAS protocol includes a find-command, similar to UNIX 'find', the storage system can receive the NAS find-command and perform the search on the filesystem list file.

The storage system may provide a find-utility, e.g. an executable file under a specific directory-path. The name of the find-utility and its pathname are published to the client. The client can execute the find-utility, i.e., type the execute command in the command-line of the client Operating-System (OS), the OS will read the executable file from the storage system and execute it at the client side on the client filesystem object list which is also read from the storage system and transferred to the client.

FIG. 1 illustrates a storage system 100, a client 130 and a network 90 coupled between the storage system 100 and the client 130 according to an embodiment of the invention. The network may be a NAS network.

The client sends a client read request (denoted "read client index file") to the storage system. The request refers to files that belong to at least certain portion of filesystem 120.

The storage system 100 stores filesystem 120. File system 120 includes files 121 (including data and metadata of the files) and a filesystem data structure that is illustrated as including filesystem index file 110 and pathnames 140. File system index file 110 includes pathname retrieval information such as pointers File-ref 111(1)-(n) that enable a retrieval of pathnames, paths 141(1)-141(m) from pathnames 140.

The storage system sends to the client a client index-file 150 with pathnames (paths 151(1)-151(m)) of files that belong to the at least certain portion of the filesystem.

The storage system may store additional filesystem metadata (not shown)—such as but not limited to filesystem attribute metadata that include attributes (other than pathnames) of the files that belong to the filesystem. The additional filesystem metadata may be for example, inodes, directories information, etc.

Figure 2:
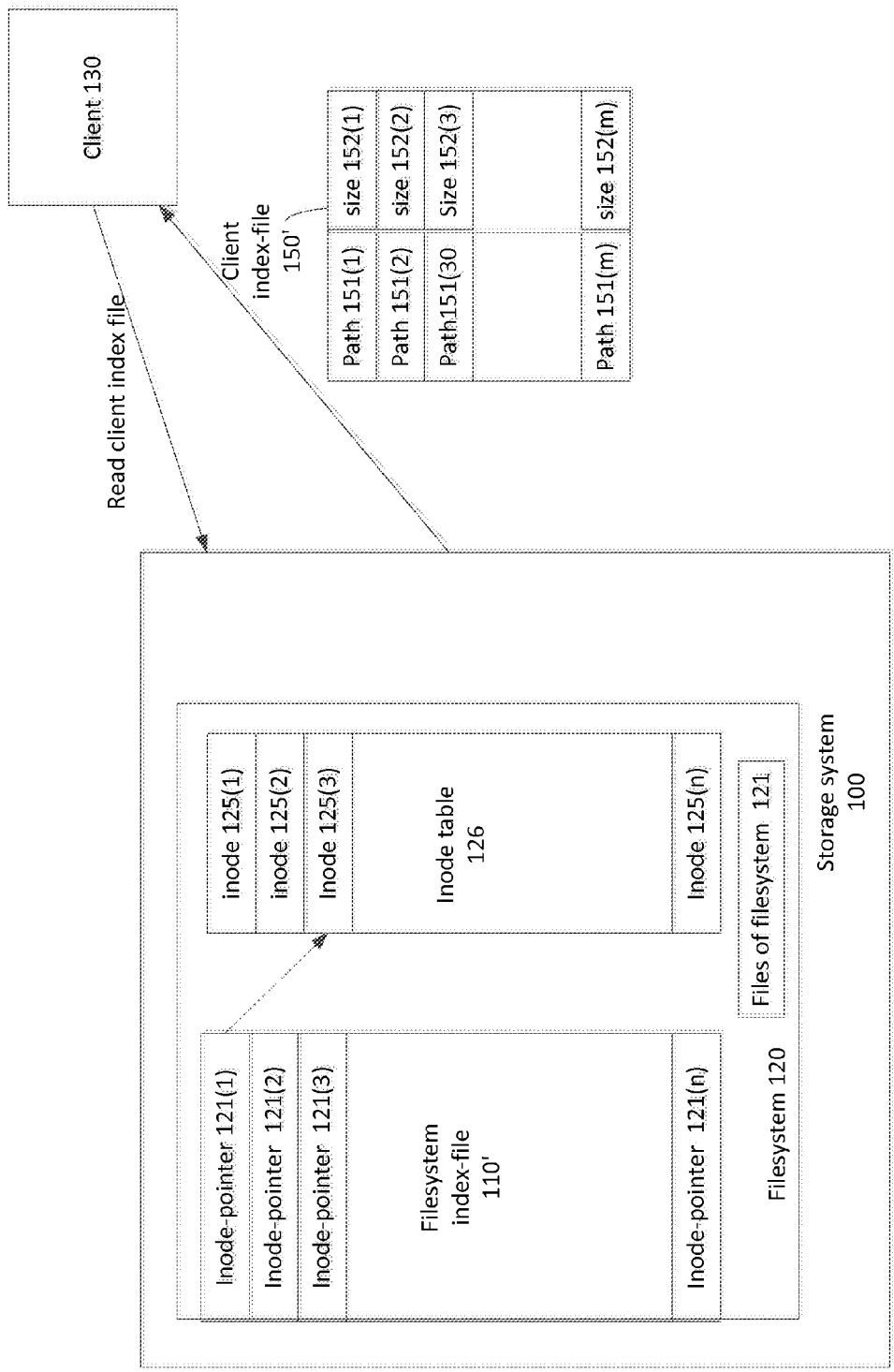
FIG. 2 illustrates a storage system and a client according to an embodiment of the invention.

FIG. 2 illustrates a storage system 100 and a client 130 according to an embodiment of the invention. The network that couples the storage system to the client was omitted for clarity of explanation.

In FIG. 2 the storage system is shown as storing file system index file 110' that includes pathname retrieval information such as pointers (denoted inode-pointers 121(1)-121(n)) that points to inodes 125(1)-125(n) of inode table 126. These pointers are also referred to as inode numbers. Inode table stores filesystem pathnames metadata or metadata that enables constructing pathnames, as well as filesystem attribute metadata that may include, for example, a size of the files of the filesystem.

The response sent to the client is shown as including pathnames path 151(1)-151(m) and size information, size 152(1)-152(m).

Figure 3:
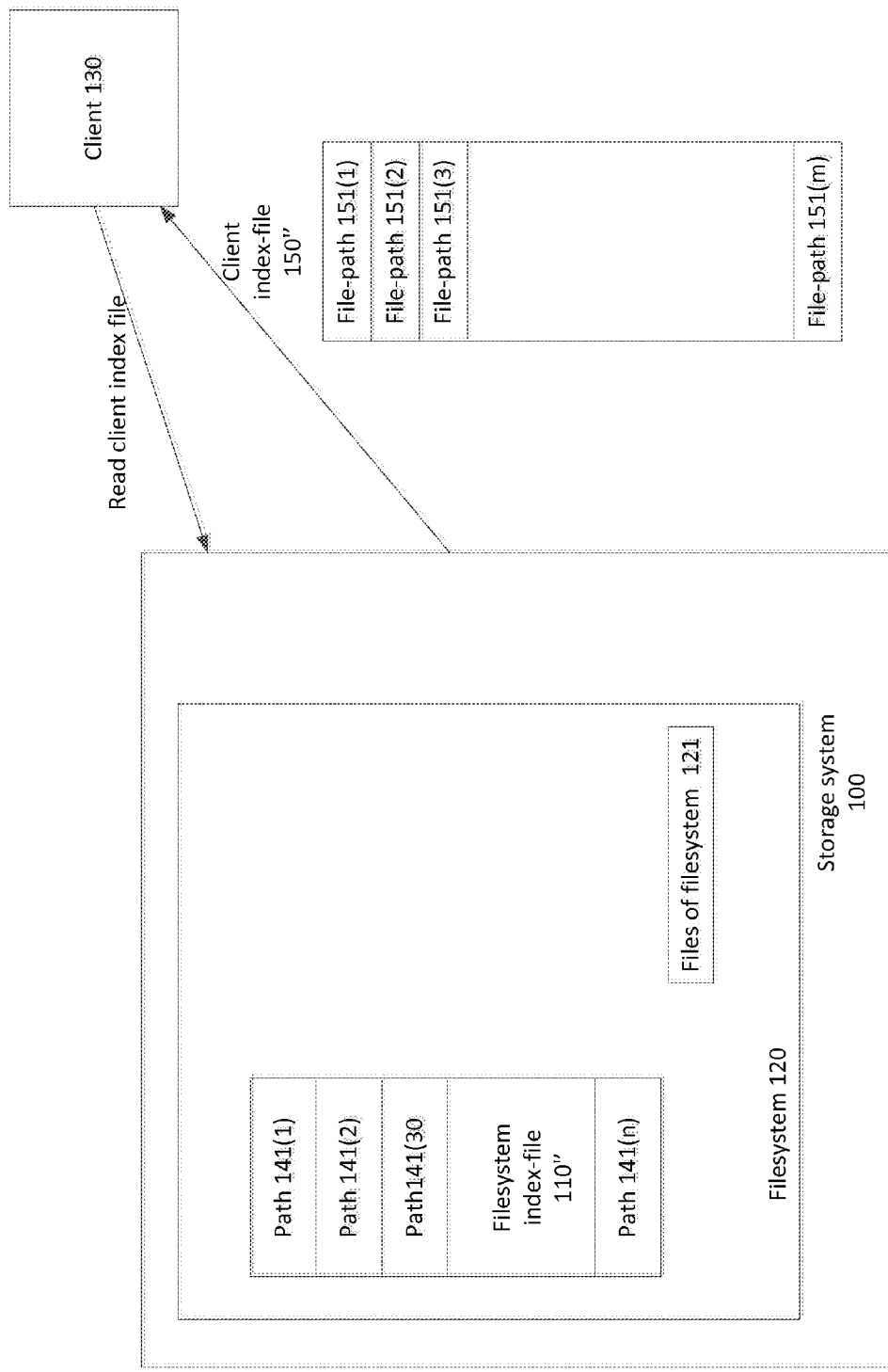
FIG. 3 illustrates a storage system and a client according to an embodiment of the invention.

FIG. 3 illustrates a storage system 100 and a client 130 according to an embodiment of the invention. The network that couples the storage system to the client was omitted for clarity of explanation.

In FIG. 3 the storage system is shown as storing file system index file 110" that includes the full pathnames 141(1)-141(n).

Figure 4:
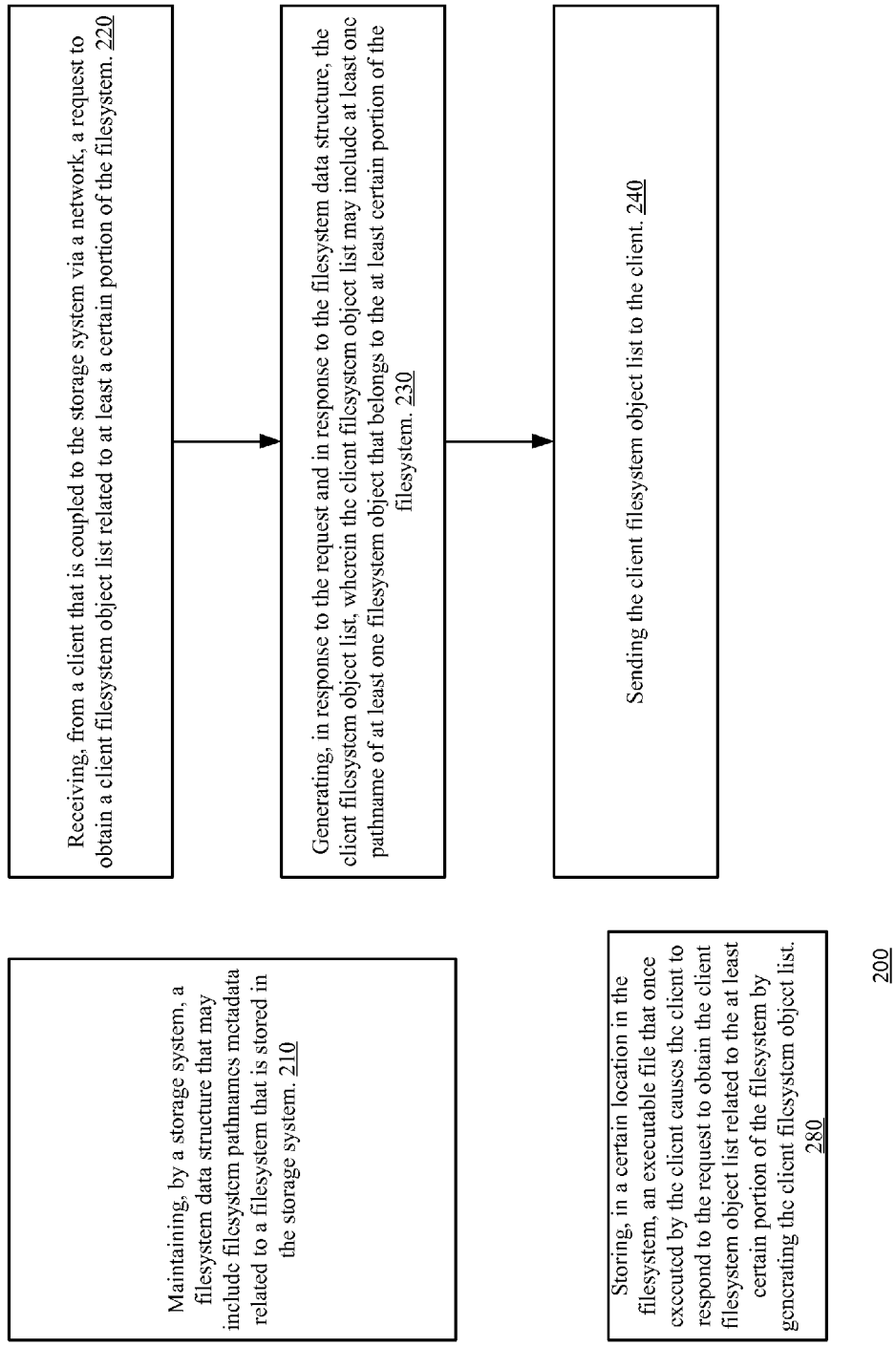
FIG. 4 illustrates a method according to an embodiment of the invention.

FIG. 4 illustrates method 200 according to an embodiment of the invention.

Method 200 may start by stages 210 and 220.

Stage 210 may be executed in a continuous manner or in real time or at least on a very high frequency.

Stage 210 may include maintaining, by a storage system, a filesystem data structure that may include filesystem pathnames metadata related to a filesystem that is stored in the storage system. Stage 210 may include updating the filesystem data structure whenever a file system operation that should affect the filesystem data structure is executed.

For example—stage 210 may include updating in real time the filesystem data structure in response to an addition of any filesystem object to the filesystem, a deletion of any filesystem object of the filesystem, a renaming of any filesystem object of the filesystem and a moving of any file system object of the filesystem.

The maintaining may include updating in real time the filesystem data structure in response to any change in the filesystem that mandates a change in the content of the filesystem data structure.

The filesystem data structure may include filesystem metadata about objects included the filesystem. Non-limiting example of file system metadata may include:
 a. Filesystem pathnames metadata.
 b. Pathnames of files that belong to the filesystem.
 c. Pathname retrieval information that facilitates a retrieval of pathnames of the files that belong to the filesystem.

d. Filesystem attribute metadata that differs from the filesystem pathnames metadata. The filesystem attribute metadata may include attributes of the files that belong to the filesystem.
e. Filesystem attribute metadata about sizes of files the file system.
f. Filesystem attribute metadata about times of an operation applied on the file.
g. Attributes retrieval information that facilitates a retrieval of attributes of the files that belong to the filesystem. For example, the attribute retrieval information may be an inode number that points to an inode where the attributes are stored.
h. Filesystem attribute metadata about client access permissions related to the files that belong to the at least certain portion of the filesystem. For example, the filesystem attribute metadata about client access permissions may include an ACL or a name of an ACL or a pointer to an ACL.
i. A mapping between predefined names and filesystem paths.

Stage 220 may include receiving, from a client that is coupled to the storage system via a network, a request to obtain a client filesystem object list related to at least a certain portion of the filesystem.

Stage 220 may include receiving a request that includes a predefined term that represents the client filesystem object list.

Stage 220 may be followed by stage 230 of generating, in response to the request and in response to the filesystem data structure, the client filesystem object list, wherein the client filesystem object list may include at least one pathname of at least one filesystem object that belongs to the at least certain portion of the filesystem.

Stage 230 may be followed by stage 240 of sending the client filesystem object list to the client.

Method 200 may include stage 280 of storing, in a certain location in the filesystem, an executable file that once executed by the client causes the client to respond to the request to obtain the client filesystem object list related to the at least certain portion of the filesystem by generating the client filesystem object list.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (TO) devices. When executing the computer program, the computer system processes information according to the computer program and produces resultant output information via IO devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for managing a filesystem by a storage system, the method comprises:

maintaining, by a storage system, a filesystem data structure that comprises filesystem pathnames metadata related to a filesystem that is stored in the storage system;

receiving, from a client that is coupled to the storage system via a network, a request to obtain a client filesystem object list related to at least a certain portion of the filesystem;

generating, in response to the request and in response to the filesystem data structure, the client filesystem object list, wherein the client filesystem object list comprises at least one pathname of at least one filesystem object that belongs to the at least certain portion of the filesystem; and sending the client filesystem object list to the client.

2. The method according to claim 1 wherein the filesystem pathnames metadata comprises pathnames of filesystem objects that belong to the filesystem.

3. The method according to claim 1 wherein the filesystem pathnames metadata comprises pathname retrieval information that facilitates a retrieval of pathnames of filesystem objects that belong to the filesystem.

4. The method according to claim 1 wherein the filesystem data structure further comprises filesystem attribute metadata that differs from the filesystem pathnames metadata.

5. The method according to claim 4 wherein the filesystem attribute metadata comprises attributes of filesystem objects that belong to the filesystem.

6. The method according to claim 5 wherein an attribute of a filesystem object of the filesystem objects that belongs to the filesystem is a size of the filesystem object.

7. The method according to claim 5 wherein an attribute of a filesystem object of the filesystem objects that belongs to the filesystem is a timestamp related to an operation applied on the filesystem object.

8. The method according to claim 4 wherein the filesystem attribute metadata comprises attributes retrieval information that facilitates a retrieval of attributes of filesystem objects that belong to the filesystem.

9. The method according to claim 1 wherein the generating of the client filesystem object list is responsive to client access permissions related to filesystem objects that belong to the at least certain portion of the filesystem.

10. The method according to claim 1 wherein the request to obtain the client filesystem object list comprises a predefined term that represents the client filesystem object list.

11. The method according to claim 1 comprising storing, in a certain location in the filesystem, an executable file that once executed by the client causes the client to respond to the request to obtain the client filesystem object list related to the at least certain portion of the filesystem by generating the client filesystem object list.

12. The method according to claim 1 wherein the maintaining comprises updating in real time the filesystem data structure in response to any change in the filesystem that mandates a change in the content of the filesystem data structure.

13. The method according to claim 1 wherein the maintaining comprises updating in real time the filesystem data structure in response to an addition of any filesystem object to the filesystem, a deletion of any filesystem object of the filesystem, a renaming of any filesystem object of the filesystem and a moving of any file system object of the filesystem.

14. The method according to claim 1 wherein the request is a network-attached storage (NAS) storage read request.

15. A non-transitory computer readable medium that stores instructions that once executed by a storage system causes the storage system to executed the stages of: maintain a filesystem data structure that comprises filesystem pathnames metadata related to a filesystem that is stored in the storage system; receive, from a client that is coupled to the storage system via a network, a request to obtain a client filesystem object list related to at least a certain portion of the filesystem; generate, in response to the request and in response to the filesystem data structure, the client filesystem object list, wherein the client filesystem object list comprises at least one pathname of at least one filesystem object that belongs to the at least certain portion of the filesystem; and send the client filesystem object list to the client.

16. A storage system comprising a controller and an interface, wherein the controller is configured to maintain a filesystem data structure that comprises filesystem pathnames metadata related to a filesystem that is stored in the storage system; wherein the interface is configured to receive, from a client that is coupled to the storage system via a network, a request to obtain a client filesystem object list related to at least a certain portion of the filesystem; wherein the controller is configured to generate, in response to the request and in response to the filesystem data structure, the client filesystem object list, wherein the client filesystem object list comprises at least one pathname of at least one filesystem object that belongs to the at least certain portion of the filesystem; and wherein the interface is configured to send the client filesystem object list to the client.

* * * * *